(12) United States Patent
Patterson, Jr.

(10) Patent No.: US 6,443,677 B1
(45) Date of Patent: Sep. 3, 2002

(54) NUT PLATE AND METHOD FOR MAKING SAME

(75) Inventor: John P. Patterson, Jr., Arlington Heights, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/736,639

(22) Filed: Dec. 14, 2000

(51) Int. Cl.⁷ .......................... F16B 27/00; F16B 37/02
(52) U.S. Cl. .......................... 411/174; 411/85; 411/112; 470/20
(58) Field of Search .......................... 411/84, 85, 111, 411/112, 113, 174, 175, 183; 470/20

(56) References Cited

U.S. PATENT DOCUMENTS

| | | | |
|---|---|---|---|
| 3,496,980 A | * | 2/1970 | Steward et al. .......... 411/112 |
| 4,375,933 A | * | 3/1983 | Hassler et al. .......... 411/174 X |
| 5,118,234 A | | 6/1992 | Norkus |
| 5,538,377 A | * | 7/1996 | Stewart et al. .......... 411/174 |
| 5,934,851 A | | 8/1999 | Stewart et al. |
| 5,971,686 A | | 10/1999 | Stewart et al. |

* cited by examiner

*Primary Examiner*—Neill Wilson
(74) *Attorney, Agent, or Firm*—Mark W. Groll; Paul F. Donovan

(57) ABSTRACT

A nut plate is formed from a generally U-shaped clip having first and second elongated legs and a connecting leg extending therebetween. The first leg has an opening therein for receipt of a nut and for securing the nut in the leg. The second leg has a pass-through opening opposing the nut opening. The nut is fully passed through the pass-through opening for securing in the first leg. The nut can be positioned in the first leg without deflection and urging away of the legs from one another. A method for making the nut plate includes the steps of forming an elongated strip, forming a nut opening in the strip and forming a pass-through opening in the strip. The strip is bent to define a clip having the first and second legs and the connecting leg. The clip can be heat treated. A nut is then passed through the pass-through opening into the nut opening and is secured to the first leg.

16 Claims, 1 Drawing Sheet

NUT PLATE AND METHOD FOR MAKING SAME

BACKGROUND OF THE INVENTION

This invention pertains to a fastener assembly and more particularly to a nut plate fastener assembly for use with bolted members and a method for making the nut plate.

Fastener assemblies are used in many applications to, for example, fasten components to one another. One common type of fastener assembly is a threaded nut and bolt combination.

While nuts and bolts have been used for fastening for decades and perhaps centuries, they can at times, and in certain circumstances be difficult to manipulate into engagement with one another. Specifically, in a typical application, a bolt is inserted through openings in the components to be fastened to one another and a nut is threaded on to the bolt. Generally, either the bolt head or the nut must be maintained fixed while the other is rotated to engage the threads and secure the fastening assembly. This can be quite difficult where the nut is in a "blind" location where a user cannot see whether the nut is properly located, or the bolt is properly threadedly engaged with the nut. This can be even more difficult when the nut is in a location that is difficult to reach vis-a-vis limited accessibility.

To this end, nut plates have been used on which a nut is mounted to a plate, which plate is mounted to one component that is secured to another component. These nut plates have found many uses, such as in automobile assembly for bumper attachments, trailer hitch attachments and the like.

An example of a nut plate is disclosed in Stewart et al., U.S. Pat. No. 5,971,686 entitled Retained Fastener. One embodiment of the assembly disclosed in Stewart et al. is a generally U-shaped clip having elongated legs. A nut is disposed through an opening in one of the legs, which nut is inserted between the legs from about a central portion of the clip. The nut is then secured to the clip at the corners of the nut.

While the retained fastener disclosed in Stewart et al. may well serve certain functions it does, in fact, have its drawbacks. One such drawback is that the nut is inserted into the central portion of the clip prior to the bending of the legs. This can add considerably to the overall fabrication and/or assembly costs of such a fastener device. Alternately, the clip may be formed, e.g., stamp and bent, and the legs of the clip spread to insert the nut. In that these fasteners are commonly used and may be used in considerably large quantities, it would be desirable to maintain the cost of such assemblies as low as is reasonably achievable.

Another assembly is disclosed in Stewart et al., U.S. Pat. No. 5,934,851 entitled Staked Fastener Having Wrenchable Flats. In this Stewart et al. patent, it appears that rather a complex assembly is used for affixing or mounting the nut to the plate. Again, such a complex assembly could add to the overall costs of manufacturing or fabricating such a fastener device which, again, is undesirable.

Another drawback to these assemblies is that the material may require heat treatment in order to achieve specified mechanical properties, such as increased toughness and ductility. Typically, heat treatment is carried out after formation and working of the clip material. In that known nut plates either have the nuts inserted before working, e.g., bending, or require that he clip legs be spread to insert the nuts, it is both difficult and costly, if even practical to heat treat known nut plate assemblies.

Accordingly, there exists a need for a nut plate-type fastener assembly in which the plate can be fully fabricated prior to positioning a nut therein. Desirably, such a nut plate can be manufactured from post forming treated materials, e.g., heat treated materials, without adversely affecting the characteristics of the plate material. Additionally, it is desirable for such a nut plate to be heat treated without adversely affecting the mechanical properties, e.g., strength, ductility, and the like, of the nut that is positioned in and mounted to the plate.

BRIEF SUMMARY OF THE INVENTION

A nut plate includes a generally U-shaped clip having first and second elongated legs and a connecting leg extending therebetween. The first leg has an opening for receipt of a nut and for securing the nut in the leg. The second leg has a pass-through opening in opposing relation to the nut opening. The nut can be fully passed through the pass-through opening and positioned in the first leg without deflection and urging away of the legs from one another.

In a current embodiment, the nut plate includes two nut openings and two pass-through openings, one associated with each of the nut openings. Both of the nuts can be positioned in the first leg nut openings without deflection and urging away of the legs from one another.

The nut plate can be manufactured from post-forming treated materials, that is, it can be heat treated and the nut subsequently assembled without adversely affecting the characteristics of the plate material. To this end, a preferred nut plate is formed from heat treated material. The clip is stamped and formed, e.g., bent, and is heat treated after stamping and forming.

The nut plate can be formed having an enlarged, arcuate extension region at about each nut opening. One or both of the legs can be formed to define an enlarged entrance region into the clip.

The pass-through openings can be formed as enlarged circular openings having a diameter slightly larger than a distance across opposing apices of the nut or the diameter of the nut flange. Alternately, the pass-through openings can be formed having other shapes, such as a "D" shaped configuration. To provide better contact between the nut plate and the component to which it is mounted, the first leg can be formed having a raised area surrounding each of the nut openings.

A method for forming the nut plate includes the steps of forming an elongated strip, forming a nut opening in the strip, forming a pass-through opening in the strip, and bending the strip to define first and second legs and a connecting leg. The nut opening is formed in the first leg and the pass-through opening is formed in the second leg opposing the nut opening. The method further includes passing a nut through the pass-through opening into the nut opening and securing the nut to the first leg.

A preferred method includes heat treating the strip after bending and prior to passing the nut through the pass-through opening.

A current method includes forming two nut openings in the strip, forming two pass-through openings in the strip and passing a nut through each of the pass-through openings into a respective nut opening.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
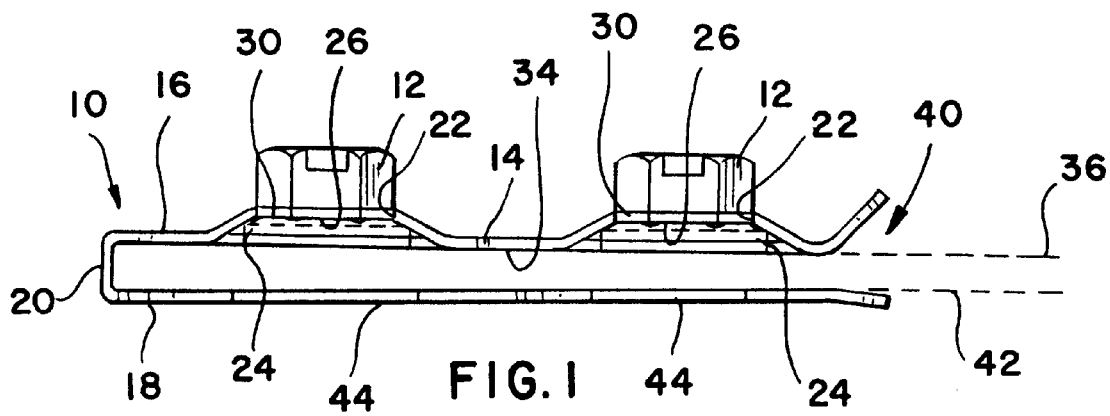
FIG. 1 is a front view of an exemplary double nut plate embodying the principles of the present invention and manufactured in accordance with a method of the present invention.
Figure 2:
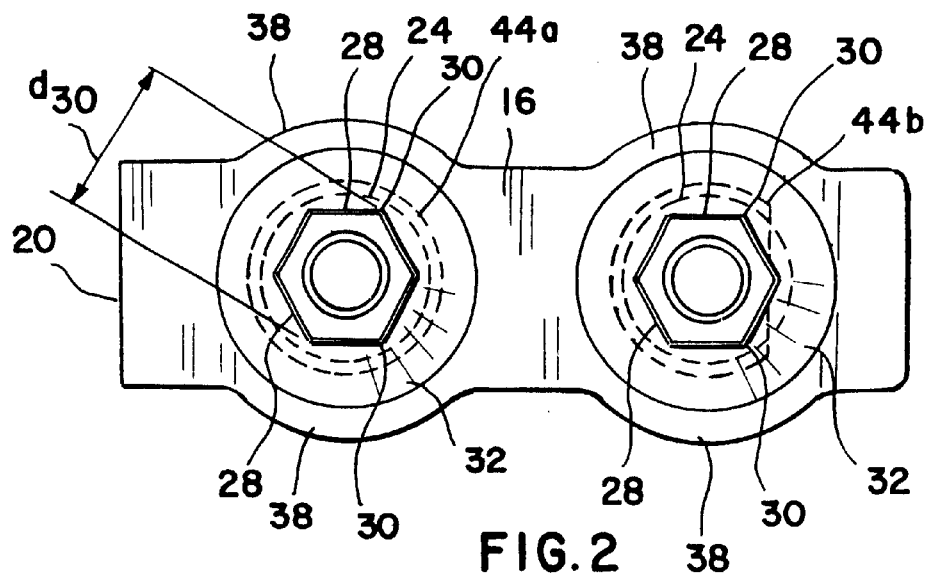
FIG. 2 is a top view of the exemplary double nut plate of FIG. 1.
Figure 3:
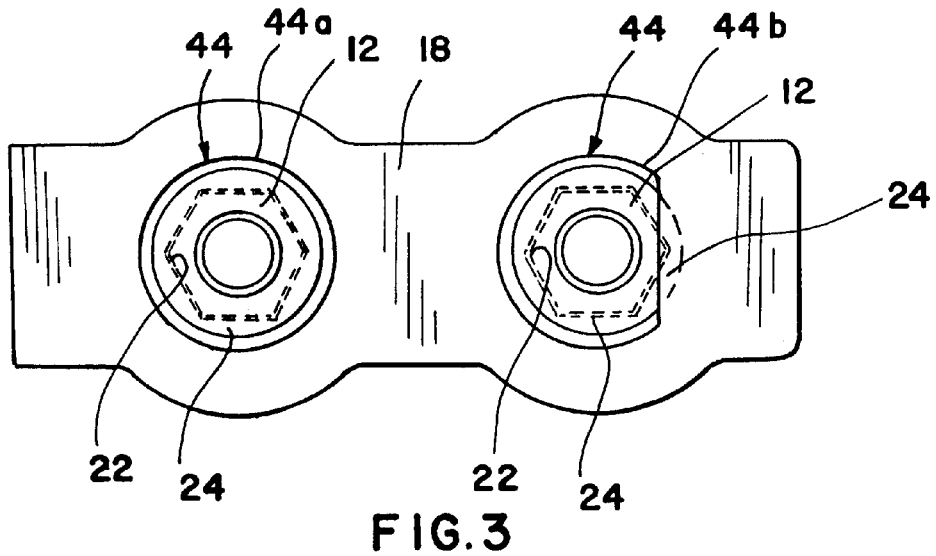
FIG. 3 is a bottom view of the exemplary double nut plate of FIGS. 1 and 2.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated. It should be further understood that the title of this section of this specification, namely, "Detailed Description Of The Invention", relates to a requirement of the United States Patent Office, and does not imply, nor should be inferred to limit the subject matter disclosed herein.

Referring to the figures and in particular to FIG. 1, there is shown one embodiment of a nut plate 10 in accordance with the principles of the present invention. The illustrated exemplary nut plate 10 is a double nut plate, that is, it has two nuts 12 mounted thereto, and includes a generally U-shaped clip 14 and the pair of nuts 12 mounted to the clip 14. It will be recognized by those skilled in the art from a study of the drawings and a further reading of the present disclosure that a nut plate 10 in accordance with the principles of the present invention can be made having any number of nuts 12 mounted thereto from a minimum of one nut to a maximum of essentially any desired configuration, within practicality.

The U-shaped clip 14 includes a first leg 16 and a second leg 18 connected to one another by a connecting leg 20. The first and second legs 16, 18 are relatively elongated compared to the connecting leg 20. The first leg 16 includes a nut opening 22 formed therein for each nut 12 that is mounted to the clip 14. The nut openings 22 can take the same general shape as the nuts 12 so that the nuts 12 fit within the nut openings 22.

As will be recognized by those skilled in the art, various different types of nuts can be used with the present nut plate. In a present embodiment, the nut plate 10 is configured for use with standard hexagonal, flanged nuts 12 in which an integral flange 24 extends outwardly from a side 26 of each nut 12, e.g., the nut bottom, beyond the flats or apices 30 of the nut 12. These nuts 12 are well known in the art, and will be readily recognized by those skilled in the art.

As seen in FIG. 1, the first leg 16 can have a raised or off-set region 32 at about each of the nuts 12, surrounding each of the nut openings 22. In this configuration, the nut flange 24 lies essentially co-planar with an inner surface 34 of the first leg 16 as indicated by the plane at 36. Thus, when the plate 10 is positioned over a component (not shown) a relatively large surface area of the plate 10 and the nut flange 24 is in contact with that component.

The plate 10 can further include arcuate or otherwise extended portions as indicated at 38 at about each of the nut openings 22. These extended portions provide additional surface area and lateral dimension for proper attachment and/or alignment of the plate 10 with the component to which it is attached. In the illustrated embodiment, these enlarged areas 38 define a generally circular shape surrounding the flange 24. The U-shaped clip 14 can further include an enlarged or opened entrance area 40 to facilitate inserting the plate 10 over the component. As seen in FIG. 1, this can be provided by forming one or both of the legs 16, 18 at an angle relative to planes (as indicated at 36, 42) defined by the respective legs 16, 18.

The nut 12 can be secured to the plate by, for example, skiving by scraping (also known as staking) the comers 30 of the nut 12 to deform the comers 30 and thus secure the nuts 12 to the plate 10. Securing the nuts 12 to the plate 10 prevents the nuts 12 from inadvertently loosening or falling from the nut openings 22.

Unlike known plates, the present nut plate 10 includes an open area 44 formed in the second leg 18 of the plate 10 that corresponds to each nut opening 22 in the first leg 16. These second or pass-through openings 44 permit inserting the nuts 12 through the second leg 18 and into the nut openings 44, without having to spread open or otherwise bend the legs 16, 18 to insert the nuts 12. This also permits inserting the nuts 12 into the first leg 16 after the clip 14 is formed or bent to the desired shape and dimensions. This, as will be discussed below, provides a number of advantages over known fastener assemblies.

The pass-through openings 44 can take many forms, as will be recognized by those skilled in the art. For example, as indicated at 44a, the opening can be a simple enlarged, generally circular opening having a diameter $d_{44}$ slightly larger than the largest diameter across the nut apices 30 or flange 24. Alternately, as indicated at 44b, the opening can be formed having a semi-circular shape which shape is commonly referred to as "D" shaped opening. In this manner, the nut 12 can be inserted through the pass-through opening 44b at an angle and fitted into the nut opening 22 in the first leg 16. Other opening configurations such as hexagonal or oblong shaped openings (not shown) through which the nut 12 will fit are within the scope and spirit of the present invention. The nut openings 44 are fully within the first leg 16.

As will be recognized by those skilled in the art, often components such as the clip portion 14 of the nut plate 10 can, if desired or required to meet specification, be post-formation treated in order to achieve certain mechanical properties. For example, when used within automotive component assemblies, it may be necessary to heat treat the clip 14 in order to increase certain mechanical properties such as stiffness and strength.

It has been found that when these components are bent subsequent to heat treatment to "fit" the nut within the clip, the bending can adversely effect the mechanical properties achieved by heat treating. That is, by bending these components after formation and heat treating the very properties that have been achieved by heat treatment can be adversely effected. It has also been found that in attempting to heat treat these components after the nuts have been mounted to the plate has resulted in other manufacturing and process problems.

Thus the present nut plate 10 having the pass-through openings 44 can provide a fastening assembly with the desired or necessary mechanical characteristics, without compromising these mechanical properties (as by bending), and without manufacturing problems (as by post formation treatment with the nuts in place). To this end, one method for making the nut plate 10 includes the steps of forming an elongated strip and subsequently bending the strip into a clip 14. A preferred method for forming the strip is stamping. During stamping, the nut openings 22, as well as the pass-through openings 44 are formed.

In bending the strip, the first leg 16 and second leg 18, as well as the connecting leg 20 are formed. The methods for making these bends are well known and will be readily appreciated by those skilled in the art. Preferably, one or both of the first and second legs 16, 18 is further formed, e.g., bent away from the other of the legs, to provide the entrance region 40.

Subsequent to stamping and bending, the clip 14 is heat treated to, for example, achieve certain desired mechanical properties, such as increased ductility and toughness. Heat treating methods will likewise be recognized by those skilled in the art.

Following heat treatment, the one or more nuts 12 can be inserted through their respective pass-through openings 44 into the nut openings 22. The nuts 12 can then be secure to the first leg 16 such as by skiving or deforming the corners 30 of the nut 12, securing the nut 12 to the clip 14.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A nut plate comprising:
   a generally U-shaped clip having first and second elongated legs and a connecting leg extending therebetween;
   the first leg having an opening therein for receipt of a nut and for securing the nut therein;
   the second leg having a pass-through opening therein, the pass-through opening being fully within the second leg, the pass-through opening being distinct and separate from the first leg opening, wherein the nut can be fully passed through the pass-through opening for securing in the first leg, and wherein the nut can be positioned in the first leg without deflection and urging away of the legs from one another.

2. The nut plate in accordance with claim 1 wherein the U-shaped clip is heat treated.

3. The nut plate in accordance with claim 1 wherein the first leg includes two openings for receipt of two nuts and wherein the second leg includes two pass-through openings, one associated with each of the nut openings, wherein the nuts can be positioned in the first leg nut openings without deflection and urging away of the legs from one another.

4. The nut plate in accordance with claim 1 wherein the clip includes an enlarged, arcuate extension region at about the nut opening.

5. The nut plate in accordance with claim 1 wherein at least one of the legs is formed so as to define an enlarged entrance region into the clip.

6. The nut plate in accordance with claim 1 wherein the pass-through opening is formed as an enlarged circular opening having a diameter at least as large as a distance across opposing apices of the nut.

7. The nut plate in accordance with claim 1 wherein the first leg is formed having a raised area surrounding the nut opening.

8. The nut plate in accordance with claim 3 wherein the first leg is formed having a raised area surrounding each of the nut openings.

9. The nut plate in accordance with claim 2 wherein the first leg includes two openings for receipt of two nuts and wherein the second leg includes two pass-through openings, one associated with each of the nut openings, wherein the nuts can be positioned in the first leg nut openings without deflection and urging away of the legs from one another.

10. A nut plate comprising:
    a generally U-shaped clip having first and second elongated legs and a connecting leg extending therebetween, the U-shaped clip being heat treaded;
    the first leg having a first and second nut openings therein for receipt of first and second nuts and for securing the nuts in their respective openings;
    the second leg having first and second pass-through openings therein corresponding to the first and second nut openings, the pass-through openings being fully within the second leg, wherein the nuts can be fully passed through the pass-through openings for securing in the first leg, and wherein the nuts can be positioned in the first leg without deflection and urging away of the legs from one another, at least one of the legs being formed to define an enlarged entrance region into the clip, and wherein the U-shaped clip is heat treated prior to positioning the nuts therein.

11. A nut and nut plate combination comprising:
    a nut having a top surface and a bottom surface; and
    a nut plate having first and second elongated legs and a connecting leg therebetween, wherein the first leg has an opening therein for receipt of the nut and for securing the nut therein, and a raised region about the nut and surrounding the opening, such that the bottom surface of the nut is generally co-planar with an inner surface of the first leg, and wherein the second leg has an open area to permit insertion of the nut through the second leg and into the opening of the first leg.

12. A method for forming a nut plate comprising the steps of:
    forming an elongated strip;
    forming a nut opening in the strip;
    forming a pass-through opening in the strip;
    bending the strip to define a clip having first and second legs and a connecting leg, wherein the nut opening is formed in the first leg and the pass-through opening is formed in the second leg opposing the nut opening;
    passing a nut through the pass-through opening into the nut opening; and
    securing the nut to the first leg.

13. The method for forming a nut plate in accordance with claim 12 including the step of heat treating the clip after bending and prior to passing the nut through the pass-through opening.

14. The method for forming a nut plate in accordance with claim 12 including forming two nut openings in the strip, forming two pass-through openings in the strip and passing a nut through each of the pass-through openings into a respective nut opening.

15. The method for forming a nut plate in accordance with claim 14 including the step of heat treating the clip after bending and prior to passing the nut through the pass-through opening.

16. A method for forming a nut plate comprising the steps of:

forming an elongated strip;

stamping first and second nut openings in the strip;

stamping first and second pass-through openings in the strip;

bending the strip to define a clip having first and second legs and a connecting leg, wherein the first and second legs are bent so that the first nut opening is in opposing relation to the first pass-though opening and the second nut opening is in opposing relation to the second pass-though opening;

heat treating the clip;

passing a first nut through the first pass-through opening into the first nut opening and passing a second nut through the second pass-through opening into the second nut opening; and securing the first and second nuts to the first leg.

* * * * *